(12) United States Patent
Ardern

(10) Patent No.: US 12,325,216 B2
(45) Date of Patent: Jun. 10, 2025

(54) SURFACE PANEL

(71) Applicant: Fergus Jonathan Ardern, Lingwood (GB)

(72) Inventor: Fergus Jonathan Ardern, Lingwood (GB)

( * ) Notice: Subject to any disclaimer, the term of this patent is extended or adjusted under 35 U.S.C. 154(b) by 229 days.

(21) Appl. No.: 17/964,682

(22) Filed: Oct. 12, 2022

(65) Prior Publication Data

US 2023/0121585 A1    Apr. 20, 2023

(30) Foreign Application Priority Data

Oct. 19, 2021    (GB) ..................................... 2114910

(51) Int. Cl.
| | | |
|---|---|---|
| *B32B 3/12* | (2006.01) | |
| *B32B 3/06* | (2006.01) | |
| *B32B 3/30* | (2006.01) | |
| *E04C 2/36* | (2006.01) | |

(52) U.S. Cl.
CPC .................. *B32B 3/12* (2013.01); *B32B 3/06* (2013.01); *B32B 3/30* (2013.01); *E04C 2/365* (2013.01); *B32B 2307/54* (2013.01); *B32B 2419/04* (2013.01)

(58) Field of Classification Search
CPC .... B32B 3/12; B32B 3/06; B32B 3/30; B32B 2307/54; B32B 2419/04; E04C 2/365; E01C 9/086
See application file for complete search history.

(56) References Cited

U.S. PATENT DOCUMENTS

| | | | | |
|---|---|---|---|---|
| 4,084,367 A | * | 4/1978 | Saylor .................. | B29D 24/005 428/116 |
| 4,973,506 A | * | 11/1990 | Bauer ..................... | B32B 15/08 428/116 |
| 5,437,936 A | * | 8/1995 | Johnson ................. | B21D 47/00 428/603 |
| 5,776,582 A | * | 7/1998 | Needham .............. | E04B 1/6179 428/116 |
| 6,511,257 B1 | * | 1/2003 | Seaux ..................... | E01C 9/086 |

(Continued)

FOREIGN PATENT DOCUMENTS

| | | |
|---|---|---|
| CN | 209537973 | 10/2019 |
| CN | 209537973 U | 10/2019 |

(Continued)

*Primary Examiner* — Brian E Glessner
*Assistant Examiner* — Adam G Barlow
(74) *Attorney, Agent, or Firm* — Bradley Arant Boult Cummings LLP

(57) ABSTRACT

A surface panel is disclosed, the panel comprising two planar members in parallel spaced arrangement and being joined together by a plurality of mutually parallel tubular cells. Each tubular cell defines with the planar members an isolated cell volume. A tubular cell wall can be contiguously arranged with a neighbouring cell and also share a dividing wall with said cell.

Preferably a tubular cell has a hexagonal shape with the cells forming a honeycomb array. A planar member optionally comprises a surface which further comprises a plurality of ribs arranged in a hexagonal configuration, with the diameter of each said hexagonal tubular cell being larger than the diameter of each said hexagonal rib configuration of said first planar member.

10 Claims, 3 Drawing Sheets

(56) References Cited

U.S. PATENT DOCUMENTS

| | | | | |
|---|---|---|---|---|
| 2005/0108968 A1* | 5/2005 | Forster | ............ | E04F 15/02194 52/578 |
| 2008/0034693 A1* | 2/2008 | Moore | ............ | B29D 99/0089 52/417 |
| 2009/0301004 A1 | 12/2009 | Dagesse | | |
| 2010/0221487 A1* | 9/2010 | Leng | ............ | B32B 3/12 428/116 |
| 2012/0031957 A1* | 2/2012 | Whitaker | ............ | B65D 5/566 428/116 |
| 2012/0077052 A1* | 3/2012 | Demetriou | ............ | B32B 9/005 428/593 |
| 2015/0239200 A1* | 8/2015 | Bartolome | ............ | B32B 27/42 428/118 |
| 2015/0266260 A1* | 9/2015 | Fujioka | ............ | B32B 5/06 428/116 |
| 2016/0052224 A1* | 2/2016 | Ho | ............ | E04C 2/46 428/116 |
| 2016/0361889 A1* | 12/2016 | Bartolome | ............ | B32B 5/12 |
| 2017/0043550 A1* | 2/2017 | Coïc | ............ | B32B 3/12 |
| 2018/0037015 A1* | 2/2018 | Yoshii | ............ | B32B 29/08 |
| 2018/0229443 A1* | 8/2018 | Pham | ............ | B29C 70/026 |
| 2019/0119862 A1* | 4/2019 | Penland, Jr. | ............ | E01C 5/18 |
| 2020/0331245 A1* | 10/2020 | Seo | ............ | B32B 27/36 |
| 2022/0314573 A1* | 10/2022 | Nakamura | ............ | B32B 5/024 |
| 2023/0046294 A1* | 2/2023 | Foran | ............ | B32B 5/18 |
| 2023/0064072 A1* | 3/2023 | Jones | ............ | B32B 7/12 |
| 2023/0136149 A1* | 5/2023 | Nam | ............ | H01Q 17/008 342/2 |

FOREIGN PATENT DOCUMENTS

| | | |
|---|---|---|
| CN | 111196071 | 5/2020 |
| CN | 111196071 A | 5/2020 |
| GB | 2428432 A | 1/2007 |
| JP | H10266110 | 10/1998 |
| JP | H10266110 A | 10/1998 |
| WO | WO-2005035874 A1 | 4/2005 |
| WO | WO-2007010195 A1 | 1/2007 |
| WO | 2020176833 | 9/2020 |
| WO | WO-2020176833 A1 | 9/2020 |

\* cited by examiner

SURFACE PANEL

FIELD OF THE INVENTION

The present invention relates to a panel for covering a surface and in particular to a panel that can be assembled, with other like panels into a planar array, wherein the individual panels are connected to neighbouring panels by a securing mechanism. The array serves to allow people or vehicles to move over the assembled panels without unduly damaging the surface, such as at an exhibition or an event such as a concert.

REVIEW OF THE PRIOR ART KNOWN TO THE APPLICANT

Examples of surface panels which interconnect at their edges to form a planar array may be found in the following patent and patent application, GB 2428432 and WO2007/010195.

It is known that the interconnecting of surface panels, enables a planar array of panels to be built up, the array being suitable for use as temporary decking on soft ground, hard standing for aircraft, a temporary track way over ground, a temporary runway for aircraft, amongst other possible uses. By the use of appropriately sized panels, the array can be used to cover areas which are smaller in size, such as kitchens, bathrooms, tent floors and the like.

The disclosures of GB2428432 and WO2005035874, discloses a surface panel suitable to be joined together to form an array of panels, wherein the panels are placed on a surface and are interconnected in such manner that their contiguous edges form no rectilinear lines which would form lines of weakness extending across the array. Further, a secondary locking mechanism is provided which automatically locks tiles together when they are interconnected without the inherent problem of the tiles being difficult to fit together. The main problem associated with the use of such interlocking floor panels is that the internal structure of each panel has large open cavities which collapse under substantial heavy loads. This collapsing causes the cavities to blow out the peripheral retaining wall of the panel, causing the panel structure to fail and thereby no longer to be able to support the heavy load placed upon it.

It is therefore a principal aim of the present invention to provide a surface covering panel suitable for assembling into an array formed of like panels, wherein the panels are constructed such that they are able to support a heavier mass than prior art panels and do not collapse, thereby preventing the body of the tile from failing when a heavy load is placed upon it.

SUMMARY OF THE INVENTION

According to a first aspect of the invention, there is provided a surface panel comprising two planar members in parallel spaced arrangement and being joined together by a plurality of mutually parallel tubular cells, each tubular cell defining with the planar members an isolated cell volume, and wherein at least one planar member further comprises a surface which comprises a plurality of ribs arranged in a hexagonal configuration.

The ribs allow a planar member to have improved reaction to tensive and compressive forces in the plane of the planar member. The planar member is therefore stronger than conventional planar members known in the art and the thickness of a planar member in accordance with the current invention can be thinner than in the conventional case. The tubular cells provide strength to the panel without compromising the mass of the panel by making it firstly too heavy and secondly increasing material costs, compared to a solid panel.

Preferably each said tubular cell is contiguously arranged with a neighbouring cell, to increase the overall strength and also to minimize volume between tubular cells which can, unexpectedly lead to weakening of the panel.

Conveniently, two said tubular cells share a dividing wall between said cells, which further increases the strength of the panel.

Preferably, each said tubular cell is a hexagonal tubular cell to add increased resistance to compression forces directed between the planar members. Said tubular cells are further preferably arranged in a honeycomb configuration, to also better resist lateral forces.

Preferably, the diameter of each said hexagonal tubular cell is larger than the diameter of each said hexagonal rib configuration of said first planar member.

The ribs provide additional strength to the surface panel against applied loads.

Conveniently, both said hexagonal cells of said supporting structure and said hexagonal ribs of said first planar member, are the of the same size to allow for synergistic strengthening of the surface panel.

Preferably, the ribs are arranged in a honeycomb configuration. Further preferably, a first vertex of said hexagonal tubular cell is located at a central position within a first said hexagonal rib of said first planar member; and a second vertex located at a central position within a second hexagonal rib of said first planar member; whereby said second vertex is located from said first vertex by two hexagonal shaped ribs that extend along a horizontal axis on said first planar member. Yet further preferably, a third vertex of said hexagonal shaped cell within said structure is located from said first vertex by one and a half hexagonal shaped ribs that extend along a vertical axis on said first planar member.

According to a second aspect of the invention, there is provided a method of manufacturing a surface panel according to any of the preceding claims, wherein said first planar member and said plurality of tubular cells are moulded together, whereby a first end of said each tubular cell is closed by said first planar member.

Conveniently, the method includes the step of attaching said second planar member said plurality of tubular cells, whereby a second end of said each tubular cell is closed by said second planar member.

According to a third aspect of the invention, there is provided a surface covering comprising a plurality of said surface panels according to any of the preceding claims, wherein each said panel is attachable to a neighbouring said panel via in interlocking means.

DETAILED DESCRIPTION OF THE INVENTION

Figure 1:
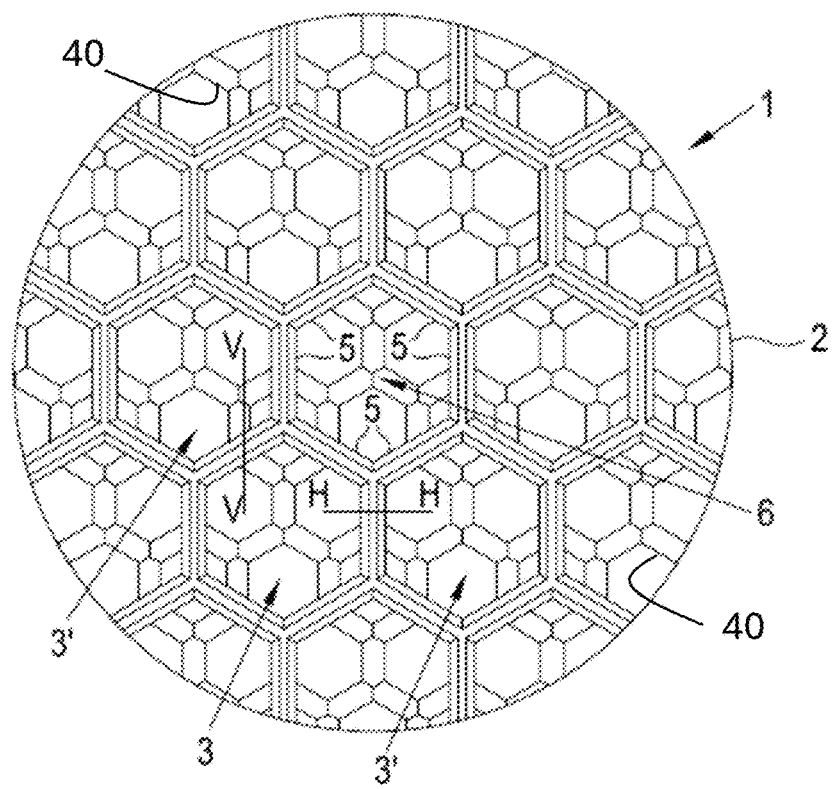
FIG. 1 is a view of a portion of the internal structure of a floor tile having hexagonal supporting cells and a single planar surface which details the tubular hexagonal cells.

FIG. 1 shows a portion of a floor panel generally indicated 1. The panel 1 has two spaced parallel planar members. The first planar member 2 is shown in the Figures. Extending between the, in-use, mutually opposed inner surfaces of the two planar members is an array of tubular cells, generally indicated 3. The tubular cells 3 have a tube axis which is, in the preferred illustrated embodiment set to be perpendicular to both of the planar members 2. The tubular cells 3 are so secured to the planar members that the ends of the tubular cells are closed, thus defining a closed volume within the tubular cells 3. Thus, the array of tubular cells 3 is joined to the top and bottom planar members and assists in maintaining the planar members in parallel spaced arrangement.

Each tubular cell 3 is defined by six side surfaces 5 which are identical in size and arranged in a regular hexagonal configuration. Further, in the preferred embodiment, a tubular cell shares each of its walls 5 with a neighbouring tubular cell 3 such that the tubular cells 3 form a regular honeycomb structure. In this, each tubular cell 3 is arranged next to a neighbouring cell generally indicated by arrow 3' and arranged in a continuous sequence along both vertical V-V and horizontal H-H axes. A plurality of ribs 40 form a hexagonal configuration.

Figure 2:
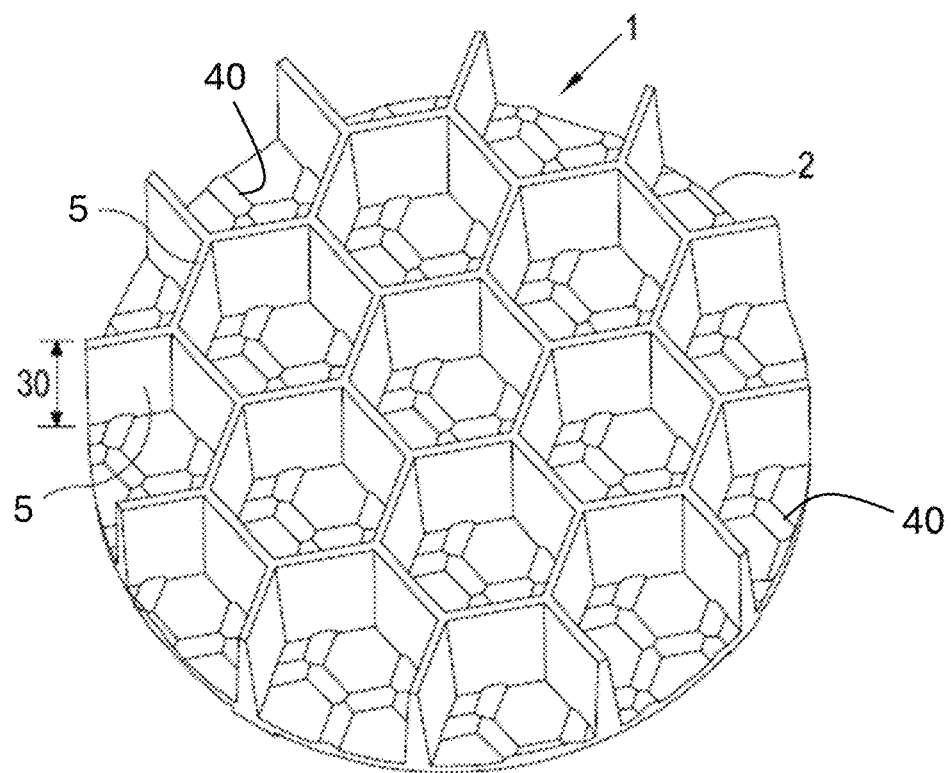
FIG. 2 is a perspective view of a portion of the internal structure of a floor tile having hexagonal supporting cells and a single planar surface.

FIG. 2 provides a perspective view of the floor panel shown in FIG. 1. The thickness of the floor panel 1 is determined primarily by the length 30 of the tubular cells 3 located between the first 2 and second [not shown] planar members. Typically, a floor panel 1 has an overall thickness within the region of 30-200 millimetres. Further, it can be seen that in the preferred embodiment shown, the base of the walls 5, in contact with a planar member, is of greater width than that of the central portion of the wall 5, and in a further preferred embodiment is thickened in the region of the expected in-use upper planar member. In a yet further preferred embodiment, the wall 5 is thicker in the region of both planar members. This adds increased strength to the structure.

Figure 3:
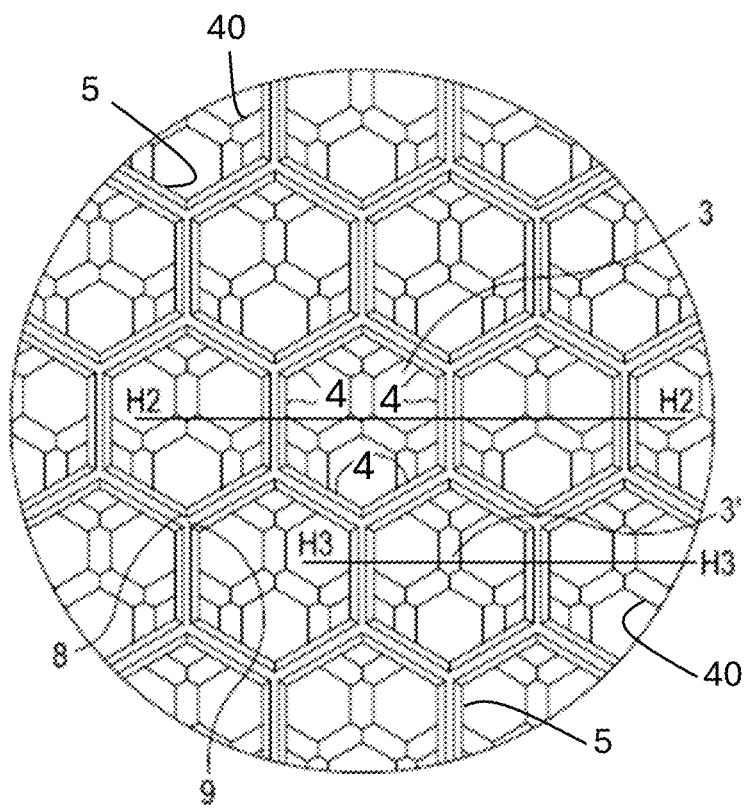
FIG. 3 is a view of a portion of the internal structure of a floor tile having hexagonal supporting cells and a single planar surface which details the honeycomb structure of the tubular hexagonal cells.
Figure 4:
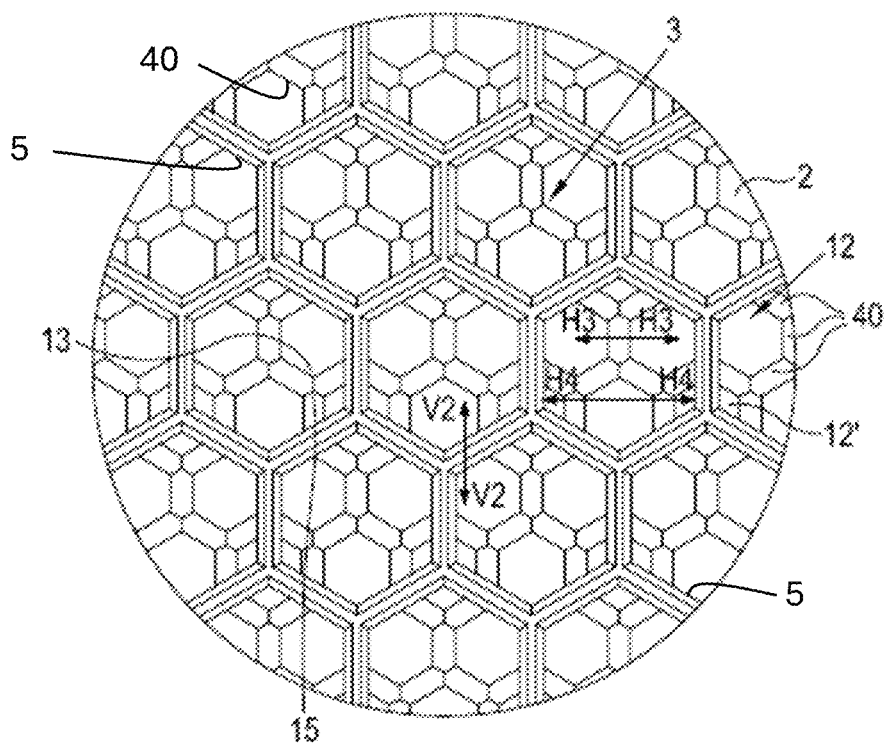
FIG. 4 is a view of a portion of the internal structure of a floor tile having hexagonal supporting cells and a single planar surface which details the hexagonal rib structures on the top planar member.
Figure 5:
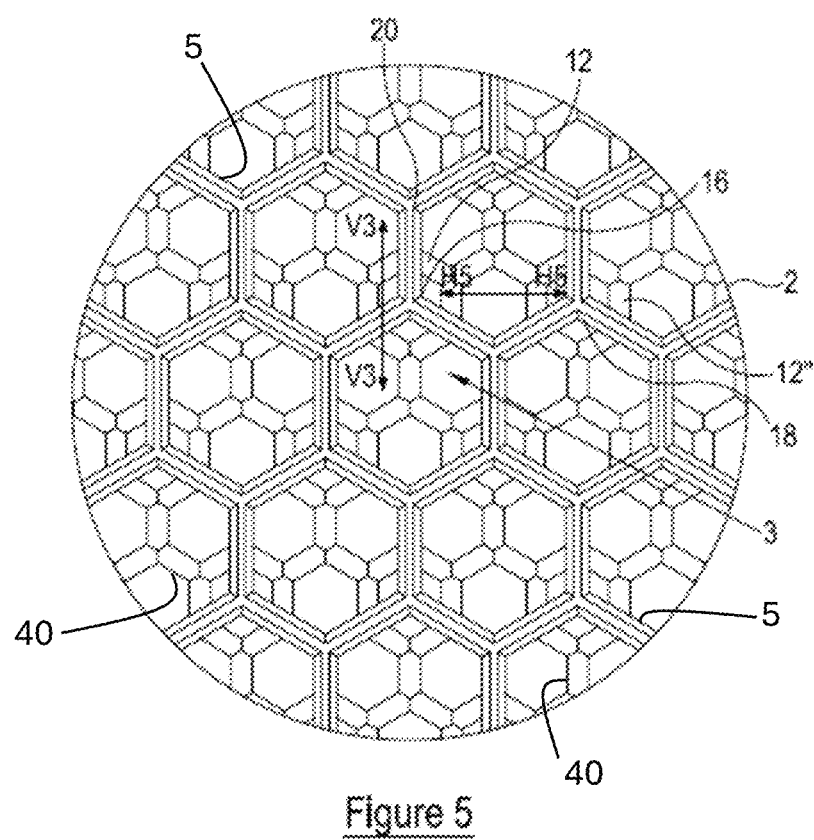
FIG. 5 is a view of a portion of the internal structure of a floor tile having hexagonal supporting cells and a single planar surface which details the offset the tubular hexagonal cells relative to the hexagonal rib structures on the top planar member.

FIGS. 3, 4, and 5 show the embodiment from a similar point of view as FIG. 1, with different features labelled. A further important feature of the invention is shown. The inner opposed surface of either or both of the planar members has a further feature which provides a planar member with increased resilience in response to stretching and compressive forces in the plane of the planar member. This is important to the structural integrity of the planar members, as the downward forces imparted by a load can cause localised deformation in the plane of the panel member, thus resulting in stretching and compressive forces in that plane. Such forces can result in damage to the structural integrity of the panel. Without being bound by theory, it is believed the ribs of the current invention, as described below, act to absorb or otherwise minimise the forces within the panel member, so allowing the material of the panel member to stretch and/or contract. The increased resistance to such in-plane forces means that the planar member can be formed thinner than those used in conventional tiles with equivalent performance. This results in material and costs savings.

The first planar member 2 has ribs 40 which are joined at each end in a continuous hexagonal rib configuration generally indicated by arrow 12. The hexagonal rib 12 configurations are arranged in multiple identical hexagonal rib configurations along both the vertical V2-V2 and the horizontal H3-H3 axes. The hexagonal ribbed portions of height of 1-5 mm. The rib configuration is preferably integrally formed with the planar member itself as part of the moulding process.

The hexagonal rib configurations 12 arranged along a horizontal axis H3-H3 are offset from neighbouring hexagonal ribs configurations 12' arranged along second horizontal axis H4-H4, whereby the bottom vertices 13 of the hexagonal ribs 40 cooperate with the vertices of the ribs 15 in forming the hexagonal rib configurations 12. This provides an array of hexagonal ribs configurations 12 and 12' that are arranged to provide a honeycomb structure.

The side length of each of the hexagonal ribs 40 is preferably smaller than the side length of the hexagonal tubular cell 3.

From FIGS. 4 and 5, it can be seen that the hexagonal ribs 40 have sides of shorter length than the sides of the hexagonal tubular cells. The shorter side length provides a more compact structure and increases the strength of the planar member in which it is integrally formed.

Moreover, in the illustrated preferred embodiment, the ratio of side lengths and the positioning of the 2 hexagonal arrays of ribbed portions is such as to provide a structure in which the two arrays combine together to strengthen the overall panel. As can be seen, the ratios and orientations of rows of hexagons are such that when an apex of any particular hexagon of the tubular cell lies over the apex of one of the hexagons of the rib array in a first row of a rib array, then the opposed apex of the hexagon in the tubular cell is positioned over the centre of a hexagon in a third row of the rib array. Also, a first end of an edge of a hexagon in the tubular array lies over apices of 3 hexagons of the rib array, whilst a second end of the edge lies over the centre of a hexagon, in the rib array, reached by travelling along an edge extending from that apex.

The panel shape may be configured into many shapes and sizes, which can be seamlessly connected to other neighbouring panels, not shown.

The floor panel has side wall members (not shown) which enclose and seal the array of tubular cells in a spaced arrangement between both the top and bottom planar members.

In use, multiple floor panels are interlocked together to provide an overall floor covering. When a substantial load is applied to the top planar member of the panels of the covering, the disclosed features act in two ways to enable the floor panels to support the load. First, the load is supported by the array of hexagonal tubular cells located within the panel. The honeycomb design enables the cells to distribute the internally generated load throughout the panel structure. When pressure is applied to multiple tubular cells, each cell will apply pressure to the wall of a neighbouring cell. This pressure to and counter pressure from the connected neighbouring cells will prevent the void contained within each cell from collapsing or blowing outwards from the panel.

The hexagonal rib configurations, provides support to a planar member in relation to lateral forces across a planar member. This allows the overall thickness of the planar member and also the tile to be reduced.

Thirdly, the relative placement and size ratios of the hexagonal array of ribs and tubular cells can contribute to a further enhancement of the strength and resilience of a panel.

In use therefore, a floor panel as described above is constructed as follows. A first planar member is formed having a honeycomb structure of ribs formed in an in-use inner surface. An array of tubular elements, all of the same length, and each having a hexagonal cross-section, and arranged in a honeycomb structure is secured to the in-use inner surface of the first planar member, by means known in the art. A second planar member is secured over the free ends of the tubular elements thus forming a closed tube volume inside the tubular elements. Side panels can then be secured around the edges of the planer members to form an enclosed panel volume.

The invention claimed is:

1. A surface panel comprising:
   a first layer comprising a plurality of mutually parallel tubular cells;
   a first planar member;
   a second planar member;
   wherein the first planar member and the second planar member are in parallel spaced arrangement relative to one another and joined together by the plurality of mutually parallel tubular cells;
   wherein each tubular cell of the plurality of mutually parallel tubular cells defines with the first planar member and the second planar member an isolated cell volume; and
   wherein at least one planar member of the first planar member and the second planar member further comprises a second layer adjacent the first layer comprising a surface which comprises a plurality of ribs arranged in a hexagonal configuration, and wherein an area bounded by each hexagonal tubular cell is larger than an area bounded by each hexagonal rib configuration.

2. The surface panel according to claim 1, wherein each tubular cell is contiguously arranged with a neighbouring cell.

3. The surface panel according to claim 1, wherein two of the tubular cells share a dividing wall between the cells.

4. The surface panel according to claim 3, wherein each tubular cell is a hexagonal tubular cell.

5. The surface panel according to claim 4, wherein the tubular cells are arranged in a honeycomb configuration.

6. The surface panel according to claim 5, wherein the ribs are arranged in a honeycomb configuration.

7. The surface panel according to claim 6, wherein:
   a first vertex of the hexagonal tubular cell is located at a central position within a first hexagonal rib of the first planar member; and
   a second vertex is located at a central position within a second hexagonal rib of the first planar member.

8. A method of manufacturing a surface panel according to claim 1, wherein the first planar member and the plurality of tubular cells are moulded together, whereby a first end of each tubular cell is closed by the first planar member.

9. The method of manufacturing a surface panel according to claim 8, comprising the step of attaching the second planar member and the plurality of tubular cells, whereby a second end of each tubular cell is closed by the second planar member.

10. A surface covering comprising a plurality of surface panels according to claim 1, wherein each panel is attachable to a neighbouring said panel via interlocking means.

* * * * *